US012694628B2

(12) United States Patent
Bell-Geddes et al.

(10) Patent No.: US 12,694,628 B2
(45) Date of Patent: Jul. 28, 2026

(54) DYNAMIC MESH-OBJECT ATTACHMENT SYSTEM FOR 3D MODELS

(71) Applicants: Lemon Inc., Grand Cayman (KY); Beijing Zitiao Network Technology Co., Ltd., Beijing (CN)

(72) Inventors: Weston Bell-Geddes, Los Angeles, CA (US); Xuanmeng Xie, Beijing (CN); Kewei Chen, Beijing (CN); Xing Gao, Beijing (CN)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 204 days.

(21) Appl. No.: 18/591,709

(22) Filed: Feb. 29, 2024

(65) Prior Publication Data

US 2025/0278899 A1 Sep. 4, 2025

(51) Int. Cl.
*G06T 19/00* (2011.01)
*G06T 17/20* (2006.01)

(52) U.S. Cl.
CPC ............. *G06T 19/006* (2013.01); *G06T 17/20* (2013.01)

(58) Field of Classification Search
None
See application file for complete search history.

(56) References Cited

U.S. PATENT DOCUMENTS

2019/0228580 A1 7/2019 Pelant et al.
2021/0110557 A1 4/2021 Busey
2024/0127529 A1* 4/2024 Fu ........................... G06T 17/20

FOREIGN PATENT DOCUMENTS

CN 107810634 A 3/2018

OTHER PUBLICATIONS

International Search Report and Written Opinion for International Application No. PCT/CN2025/077191, mailed Apr. 3, 2025, 9 pages.

* cited by examiner

*Primary Examiner* — Nicholas R Wilson

(57) ABSTRACT

A computing device for displaying a 3D virtual object for an augmented reality (AR) scene is described. The computing device has a processor and a non-transitory computer-readable memory, where the processor is configured to carry out instructions from the memory that configure the computing device to: determine a polygon mesh representation of a target object within the AR scene, where the polygon mesh representation models a physical appearance of the target object; identify a target mesh surface of the polygon mesh representation onto which the 3D virtual object should be anchored; monitor the target object and updating the polygon mesh representation according to changes in the physical appearance of the target object; and display the 3D virtual object within the AR scene according to a position of the target mesh surface on the updated polygon mesh representation, where the target mesh surface moves along with the target object.

20 Claims, 7 Drawing Sheets

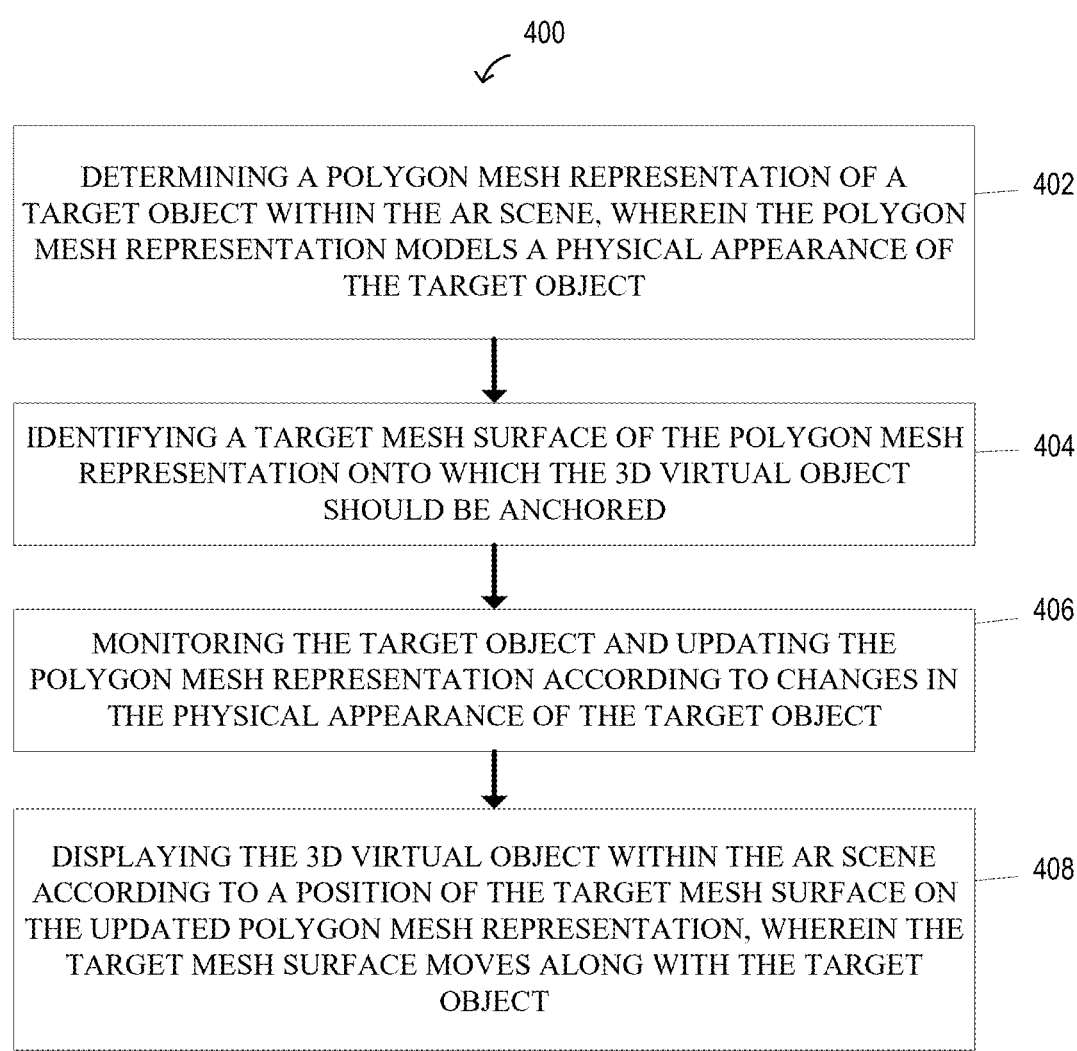

400

DETERMINING A POLYGON MESH REPRESENTATION OF A TARGET OBJECT WITHIN THE AR SCENE, WHEREIN THE POLYGON MESH REPRESENTATION MODELS A PHYSICAL APPEARANCE OF THE TARGET OBJECT ——— 402

IDENTIFYING A TARGET MESH SURFACE OF THE POLYGON MESH REPRESENTATION ONTO WHICH THE 3D VIRTUAL OBJECT SHOULD BE ANCHORED ——— 404

MONITORING THE TARGET OBJECT AND UPDATING THE POLYGON MESH REPRESENTATION ACCORDING TO CHANGES IN THE PHYSICAL APPEARANCE OF THE TARGET OBJECT ——— 406

DISPLAYING THE 3D VIRTUAL OBJECT WITHIN THE AR SCENE ACCORDING TO A POSITION OF THE TARGET MESH SURFACE ON THE UPDATED POLYGON MESH REPRESENTATION, WHEREIN THE TARGET MESH SURFACE MOVES ALONG WITH THE TARGET OBJECT ——— 408

Fig. 4

DYNAMIC MESH-OBJECT ATTACHMENT SYSTEM FOR 3D MODELS

BACKGROUND

In augmented reality (AR) applications, a common practice is to create realistic visual effects by attaching virtual objects to a 3D avatar, or a virtual representation of a user. This can involve numerous types of objects, such as digital make-up, simulated clothing, accessories, and the like. A pivotal aspect of this process is the ability to adapt the attached objects to the avatar's movements and deformations to maintain a realistic appearance and performance.

Conventionally, virtual objects are parented to other objects within the 3D space, meaning that the child object is set to follow the position and orientation of the parent object. This practice, however, has limitations. The most notable drawback is that the child object does not deform with the parent object's movements, resulting in an unrealistic appearance, particularly when the parent object is animated or affected by dynamic factors.

For example, when a 3D digital object, such as beard or eyelash, is parented to a 3D avatar's face, the object remains rigid and fails to adapt to the avatar's facial expressions and movements. This shortcoming reduces the quality of the user experience and limits the potential for advanced augmented reality effects.

Therefore, there is a need for a more sophisticated mechanism to enhance the realism and quality of virtual object placement in augmented reality software. The desired solution should not only allow the precise positioning of virtual objects but also ensure that the attached objects dynamically adjust and deform in harmony with the parent object's movements and deformations, thereby enhancing the overall user experience and the practical application of the software.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to image processors for image generation.

The field of the present disclosure generally relates to augmented reality software, particularly to the precise positioning and adjustment of objects within a 3D space.

The present disclosure aims to address the limitations and shortcomings of the current practice in augmented reality software by providing a method that enhances the realism and dynamism of object placement and movement.

Specifically, the present disclosure seeks to solve the technical problem of inflexible object placement and non-deforming behavior of parented objects in the 3D space. The current practice of object parenting often leads to an unrealistic appearance as parented objects fail to deform and adjust according to the movements of the parent objects.

To overcome these challenges, the present disclosure introduces a new mechanism, which for illustrative purposes will be herein referred to as a "mesh surface constraint." This component enables the attachment of a virtual object to a target mesh surface with precision. More importantly, it provides advanced options for object deformation, allowing the virtual object to adjust its texture orientation, position, rotation, and/or vertex normal alignment to match the dynamic changes of the target mesh surface, for example.

This mechanism not only improves the positioning of virtual objects but also enhances realism by ensuring that these objects deform synchronously with the movements and deformations of the target mesh surface. The mesh surface constraint provides improved quality of augmented reality experiences by enabling advanced effects, such as 3D make-up effects, beards, and any other virtual objects that should be pinned or anchored to a dynamically deforming mesh. For example, the virtual object may be a 3D eyelash that is placed on a target mesh surface corresponding to a user's eyelid. By placing the 3D eyelash relative to the target mesh surface instead of the target object in its entirety, the 3D eyelash moves along with movement of the eyelids seamlessly (e.g., as the user blinks).

The present disclosure notably benefits both creators and users of augmented reality software. For creators, the present disclosure facilitates the production of high-quality and realistic augmented reality effects. For users, the present disclosure provides a more immersive and realistic augmented reality experience.

The present disclosure provides a technical solution to a long-standing issue in the field of augmented reality software, delivering beneficial effects in terms of realism, quality, and user experience. The present disclosure is an advanced mechanism for object placement and deformation, designed for seamless integration and performance in various augmented reality applications.

In some aspects, a computing device is provided for displaying a 3D virtual object for an augmented reality (AR) scene. The computing device comprises a processor and a non-transitory computer-readable memory, where the processor is configured to carry out instructions from the memory that configure the computing device to: determine a polygon mesh representation of a target object within the AR scene, wherein the polygon mesh representation models a physical appearance of the target object; identify a target mesh surface of the polygon mesh representation onto which the 3D virtual object should be anchored; monitor the target object and updating the polygon mesh representation according to changes in the physical appearance of the target object; and display the 3D virtual object within the AR scene according to a position of the target mesh surface on the updated polygon mesh representation, wherein the target mesh surface moves along with the target object.

In some aspects, the target object is at least a portion of a subject in one of a captured image or a 3D avatar.

In some aspects, the target object is a head, torso, arm, leg, or finger of the subject.

In some aspects, the 3D virtual object is a facial feature decoration for a face of the subject.

In some aspects, the 3D virtual object comprises one of a virtual clothing piece or a virtual make-up feature.

In some aspects, the polygon mesh representation comprises a plurality of vertices and edges between the plurality of vertices that form polygons; and the target mesh surface comprises one of a vertex normal from the polygon mesh representation or a normal vector of a face of the polygon mesh representation.

In some aspects, the target object is a head of a subject and the target mesh surface corresponds to a moveable facial feature of the subject.

In some aspects, the target mesh surface corresponds to one of a chin, eyelid, eyebrow, lip, jaw, cheek, or nose of the subject.

In some aspects, displaying the 3D virtual object comprises rotating the 3D virtual object according to the position of the target mesh surface and an orientation of the target mesh surface.

In some aspects, displaying the 3D virtual object comprises: performing a UV mapping of a texture onto the 3D virtual object according to an orientation of the 3D virtual object.

In some aspects, performing the UV mapping comprises adjusting a Vector2 field associated with a displayed position of the texture on the 3D virtual object.

In some aspects, performing the UV mapping comprises snapping a UV mapping value within the UV mapping to a maximum value of a range of the UV mapping.

In some aspects, a method for displaying a 3D virtual object for an augmented reality (AR) scene is provided. The method comprises determining a polygon mesh representation of a target object within the AR scene, wherein the polygon mesh representation models a physical appearance of the target object; identifying a target mesh surface of the polygon mesh representation onto which the 3D virtual object should be anchored; monitoring the target object and updating the polygon mesh representation according to changes in the physical appearance of the target object; and displaying the 3D virtual object within the AR scene according to a position of the target mesh surface on the updated polygon mesh representation, wherein the target mesh surface moves along with the target object.

In some aspects, the target object is at least a portion of a subject in one of a captured image or a 3D avatar.

In some aspects, the target object is a head, torso, arm, leg, or finger of the subject.

In some aspects, the 3D virtual object is a facial feature decoration for a face of the subject.

In some aspects, the 3D virtual object comprises one of a virtual clothing piece or a virtual make-up feature.

In some aspects, the polygon mesh representation comprises a plurality of vertices and edges between the plurality of vertices that form polygons; and the target mesh surface comprises one of a vertex normal from the polygon mesh representation or a normal vector of a face of the polygon mesh representation.

In some aspects, the target object is a head of a subject and the target mesh surface corresponds to a moveable facial feature of the subject.

In some aspects, the target mesh surface corresponds to one of a chin, eyelid, eyebrow, lip, jaw, cheek, or nose of the subject.

In another aspect, a computer-readable medium storing instructions is provided. The instructions, when executed by a processor, cause the processor to perform operations comprising: determine a polygon mesh representation of a target object within the AR scene, wherein the polygon mesh representation models a physical appearance of the target object; identify a target mesh surface of the polygon mesh representation onto which the 3D virtual object should be anchored; monitor the target object and updating the polygon mesh representation according to changes in the physical appearance of the target object; and display the 3D virtual object within the AR scene according to a position of the target mesh surface on the updated polygon mesh representation, wherein the target mesh surface moves along with the target object.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 4 shows a flow diagram of an example method for displaying a 3D virtual object, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
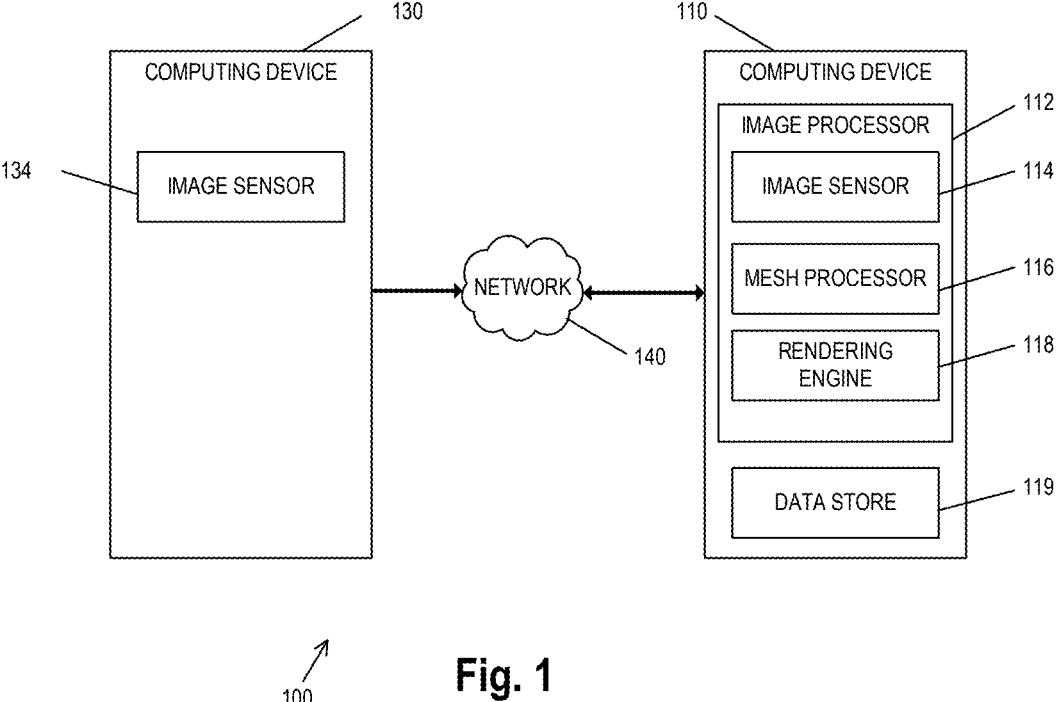
FIG. 1 shows a block diagram of an example of an image generation system, according to an example embodiment.

This and many further embodiments for a computing device are described herein. For instance, FIG. 1 shows a block diagram of an example of an AR effect creation system 100, according to an example embodiment. Generally, the AR effect creation system 100 is configured to generate an output image stream or video having virtual objects based on a user provided image stream. In some examples, the AR effect creation system 100 is used by a content creator and provided as an extension of an existing application, such as an extension to an image or video generation application.

The system 100 includes a computing device 110 that is configured to generate the image stream having virtual objects. The computing device 110 displays the virtual objects according to an orientation of a target object to which the virtual objects are anchored or linked. As an example, the virtual object may be a virtual pair of eyelashes that are anchored to eyelids of a user. An image stream of the user may be processed to dynamically identify a location of the eyelids and render the virtual pair of eyelashes according to a current position and/or orientation of the eyelids, providing an appearance of decorative eyelashes on the user.

The computing device 110 may be any type of computing device, including a smartphone, mobile computer or mobile computing device (e.g., a laptop computer, a notebook computer, a tablet computer, a netbook, etc.), or a stationary computing device such as a desktop computer or PC (personal computer). The computing device 110 may be configured to communicate with a social media platform, cloud processing provider, software as a service provider, or other suitable entity, for example, using social media software and a suitable communication network. The computing device 110 may be configured to execute one or more software applications (or "applications") and/or services and/or manage hardware resources (e.g., processors, memory, etc.), which may be utilized by users of the computing device 110.

In the example shown in FIG. 1, the computing device 110 comprises an image processor 112 and a data store 119. The data store 119 may be used to store 3D virtual objects, textures to be applied to the 3D virtual objects, or other suitable data. The image processor 112 is configured to process an image stream to include one or more of the 3D virtual objects. The image processor 112 comprises an image sensor 114, a mesh processor 116, and a rendering engine 118.

The image sensor 114 is configured to capture an input image stream and/or video of a subject, for example, a user of the computing device 110 or other suitable subject. The image sensor 114 may be a front-facing "selfie" camera or rear-facing camera of a smartphone, for example. In some examples, the image sensor 114 may be combined with, or cooperate with, a depth sensor (not shown) that is configured to estimate a distance between the computing device 110 and the subject, for example, estimating a distance to the hands, arms, feet, and/or head of the subject. The depth sensor may provide depth information that augments the images captured by the image sensor 114, providing for estimates of a three-dimensional positioning of the subject. Generally, the input image stream provides a background for an augmented reality (AR) scene onto which one or more virtual objects may be displayed.

As an alternative to capturing the image stream by the image sensor 114, the image stream may be captured or recorded by a device other than the computing device 110. In one example, the image stream is captured by a computing device 130 and provided to the computing device 110 over a network 140. For example, the computing device 130 may be a smartphone, digital camera, webcam, or other device having an image sensor 134 (similar to the image sensor 114). The image stream may be provided to the computing device 110 for processing in real-time or near real-time (e.g., adding virtual objects as the image stream is received), or may be stored in the data store 119 for subsequent processing after recording of the image stream has completed. In other examples, the computing device 110 may receive the input image stream from another instance (not shown) of the computing device 110.

The mesh processor 116 is configured to generate a suitable data structure that represents a 3D virtual object to be displayed by the computing device 110. The rendering engine 118 then renders the 3D virtual object, using the data structure from the mesh processor 116, along with the image stream. As described above, the 3D virtual object may be a 3D eyelash that is displayed on a user or other subject within the video (i.e., providing an appearance of having large eyelashes to the user), a 3D hat (i.e., providing an appearance of wearing a decorative hat to the user), 3D jewelry, or other suitable features.

In the examples described herein, the data structure comprises a polygon mesh or other suitable data structure for defining a 3D virtual object. The polygon mesh may include a plurality of vertices (e.g., points in 3D space) and a plurality of edges that connect the plurality of vertices that, together, define a shape of a polyhedral object. The polygon mesh may further comprise face information for polygons formed by the edges, where the polygons may be triangles (triangle mesh), quadrilaterals (quads), or other simple convex polygons. Other variations of a polygon mesh or any suitable data structure for defining a 3D virtual object may be generated by the mesh processor 116, in other examples.

Generation of the polygon mesh may include loading stored parameters for the polygon mesh from the data store 119, for example, from a library of previously defined polygon meshes, a user selected polygon mesh from an online repository, etc. In other examples, the mesh processor 116 may generate a polygon mesh based on one or more user inputs, such as an input image or video having a desired object to be modeled. In other words, the mesh processor 116 may process an input image of a hat and dynamically generate a polygon mesh for the hat. Dynamic generation of the polygon mesh may be performed using a neural network model or other suitable artificial intelligence engine (not shown).

The mesh processor 116 is configured to determine a polygon mesh representation (herein, "polygon mesh") of a target object within the video, where the target object is an object onto which the 3D virtual object should be anchored. As described above, the target object may be a user or subject within a video. In other examples, the target object may be an object within the video, such as a car, bicycle, dog, cat, etc. Anchoring of the 3D virtual object onto the target object results in the 3D virtual object, as it is displayed, following changes in position and orientation of the target object. For example, as a user (target object) moves their head forward and backwards in a nodding motion, a 3D hat (3D virtual object) displayed on the user's head is also moved to provide an appearance that the 3D hat is actually worn by the user. As another example, 3D wings (bird wings or airplane wings) could be displayed on the sides of a bicycle ridden by a person and the 3D wings are changed in orientation to roll with the bicycle as the bicycle leans over into a turn.

The mesh processor 116 is configured to monitor the target object within the image stream and update the polygon mesh representation for the target object according to changes in the physical appearance of the target object. For example, the mesh processor 116 may deform the polygon mesh to approximate the change in physical appearance by one or more of changing positions of vertices, inserting new vertices, removing existing vertices, etc. Changes in the physical appearance may include changes in position and orientation, such as when a user nods their head or moves within the image stream (i.e., moving from left to right within a frame of the image stream), but may also include changes in physical features of the target object, such as changes in facial expressions when a user opens their mouth, blinks their eyes, raises their eyebrows, puffs out their cheeks, flares their nostrils, etc. Changes in physical features may also include flexing muscles of an arm or other physical feature changes that result in a change of shape, not simply a change in position and orientation of the target object. In some examples, the changes in physical appearance affect only a sub-portion of the overall target object, such as the user's nose or mouth. Accordingly, updating of the polygon mesh for the target object may involve updates to only some of the vertices, edges, faces, etc.

To improve rendering of the 3D virtual object by providing a more realistic visual effect, the mesh processor 116 is configured to anchor the 3D virtual object to a sub-portion of the target object. The sub-portion may be a particular facial feature, such as a nose, chin, cheek, eyelid, or other suitable facial element. In other examples, the sub-portion may be a handlebar of a bicycle, an ear of a dog, etc. The sub-portion is represented by a target mesh surface of the polygon mesh representation of the target object. In one example, the target mesh surface is an individual face or polygon within the polygon mesh. In another example, the target mesh surface is a virtual surface (i.e., not representing an actual surface of the target object) that is generated based on a combination or merger of two or more actual faces or polygons within the polygon mesh, a combination of vertices and edges, etc. In this way, a complex polygon mesh of a nose, for example, that has hundreds of polygons, may be represented by a smaller, more easily processed data structure. In one such example, the target mesh surface is a 3D vector that represents a normal vector of a surface. In another example, the target mesh surface is a 3D vector that represents a vertex normal from the polygon mesh.

Selection of the target mesh surface, or selection of the faces or vertices that will be used to generate the target mesh surface, may be performed by a user or automatically by the mesh processor 116. In some examples, the selection may be based on nodal points of a user's face, such as a tip of the user's nose, pupil locations, eyebrow protrusion locations, vertices within the polygon mesh of the target object, etc. In one example, a user may click onto a graphical representation of the polygon mesh of the target object to select a vertex or polygon onto which the 3D virtual object should be anchored. In another example, the user may enter two-dimensional UV coordinates that map or project onto the polygon mesh of the target object. In this example, a UV coordinate of [0.5, 0.5] may correspond to a polygon at a middle of the polygon mesh (i.e., half way from a leftmost position and half way up from a lowermost position), near a nose of the user, while a UV coordinate of [0.5, 0.2] may correspond to a polygon near a chin of the user. In some examples, the UV coordinates are similar to using UV coordinates to map a pixel of an image texture onto a polygon mesh, but instead of having a pixel mapped and applied to the polygon mesh, the 3D virtual object is applied to the polygon mesh.

The rendering engine 118 processes the image stream and the polygon mesh of the 3D virtual object to generate an output image stream. The rendering engine 118 may also use the target mesh surface and/or the polygon mesh of the target object for rendering the output image stream. Generally, rendering of the 3D virtual object may be based upon a static polygon mesh of the 3D virtual object which is then transformed according to a position and orientation of the target mesh surface. For example, a hat may be a generally static object (not changing in physical appearance) represented by a static polygon mesh and the static polygon mesh may be transformed within a virtual space to obtain a final position and orientation at which the hat should be rendered. Generally, the transformation may be a change in translation (up, down, left, right, forward, back) or a change in rotation (pitch, roll, yaw), or any suitable combination thereof. In various examples, the transformation may be represented by absolute coordinates (e.g., X, Y, Z coordinates, angles of rotation from an origin, etc.), relative coordinates, or a combination of absolute and relative coordinates. In one example, the mesh processor 116 determines a transformation data structure that indicates the transformation to be performed on the static polygon mesh by the rendering engine 118. In this example, the mesh processor 116 provides both the static polygon mesh and the transformation data structure to the rendering engine 118. In another example, the mesh processor 116 determines the transformation data structure (or its individual parameters) and performs the transformation on the static polygon mesh to generate a transformed mesh. In this example, the mesh processor 116 provides the transformed mesh to the rendering engine 118, which reduces a processing burden on the rendering engine 118.

The mesh processor 116 determines the transformation data structure based on the position and orientation of the target mesh surface. In some examples, a user may select offsets or changes to the position and orientation to be applied. For example, when wearing a hat, a first user may prefer the hat to be positioned low over their ears and rotated forwards, so that a brim of the hat nearly covers their eyes, while a second user may prefer the hat to be positioned on top of their head and with the brim pointed upwards. Accordingly, a user may select a suitable offset in position and/or orientation to achieve a desired visual effect of wearing a virtual hat. Advantageously, the mesh processor 116 may determine the transformation data structure (or its parameters) relative to the target mesh surface, allowing for more precise control over the rendering of the 3D virtual object than would otherwise be provided by determining the transformation data structure relative to the target object.

As described above, the 3D object may be generally static in physical appearance in some examples (e.g., a stiff hat), but the 3D object may be dynamic in other examples. For example, a very wide brimmed hat may have a brim that dynamically deforms (e.g., flexes and bends) according to a physics engine (not shown). In some examples, the mesh processor 116 determines the transformation data structure to include additional deformation information corresponding to the dynamic deformation.

In some examples, the mesh processor 116 and the rendering engine 118 are implemented as a single component, such as a software application or module executed by a processor to perform the features described herein. In other examples, the rendering engine 118 is a standalone rendering engine or API that receives inputs from the mesh processor 116. Although the rendering engine 118 is shown as part of the image processor 112 along with the mesh processor 116, the rendering engine 118 may be located on a different computing device (not shown) in other examples. In one such example, the mesh processor 116 is located within a cloud computing device or server and the rendering engine 118 is located within a smartphone, which may offload a processing burden from the rendering engine 118 and smartphone, allowing for more complex visual effects to be provided.

Data store 119 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The data store 119 may store the images created by the computing device 130. In some examples, the user may select the image created by the computing device 130 to be used as the background texture for their social media posts.

The network 140 may comprise one or more networks such as local area networks (LANs), wide area networks (WANs), enterprise networks, the Internet, etc., and may include one or more of wired and/or wireless portions. Computing device 110 and data store 120 may include at least one wired or wireless network interface that enables communication with each other (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

Figure 2A:
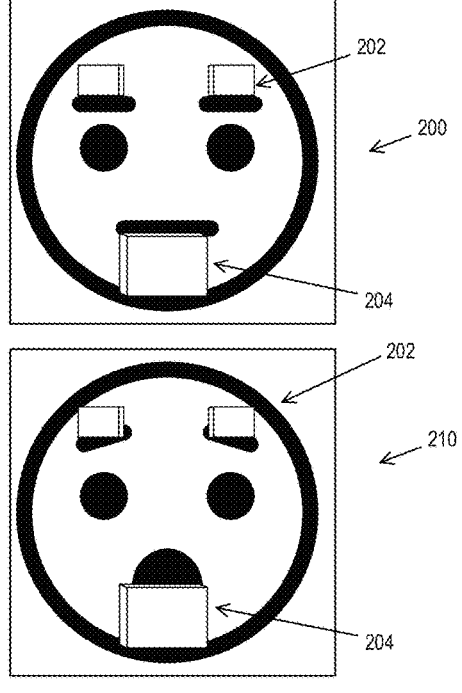
FIG. 2A shows an example image with virtual objects according to the prior art.

FIG. 2A shows an example image rendered without a mesh surface constraint according to the prior art. In FIG. 2A, a 3D virtual object is placed on an image (e.g., a face) without having the mesh surface constraint. In the example shown in FIG. 2A, an image 200 of a face with a neutral facial expression is provided with a first 3D object 202 and a second 3D object 204. The first 3D object 202 is an eyebrow decoration (shown as an individual 3D block for clarity), located above the left eye of the face, while the second 3D object 204 is a goatee (shown as a single 3D block for clarity). The eyebrow decoration may be shown as a more elaborate eyebrow, or a decorative pattern of eyebrow, for example. In other examples, the first 3D object may be placed over the eyelid of the face and represent a decorative pattern of eyelash. Other variations of decorative patterns or features will be apparent to those skilled in the art.

Another image 210 is shown of the face with a surprised facial expression, where eyes and eyebrows are raised and chin is lowered with an open mouth. In the example shown in FIG. 2A, the 3D objects 202 and 204 are still located on and/or aligned with the face, but have not been adjusted in position or orientation to align with the eyes, eyebrows, and chin of the face with the different facial expression. Accordingly, the eyebrows of the face may not align with the decorative pattern of the 3D object 202. Specifically, the eyebrow 3D object is located within the actual eyebrow of the face, not over the eyebrow of the face, and the goatee is located within the open mouth of the face, not over the chin of the face.

Figure 2B:
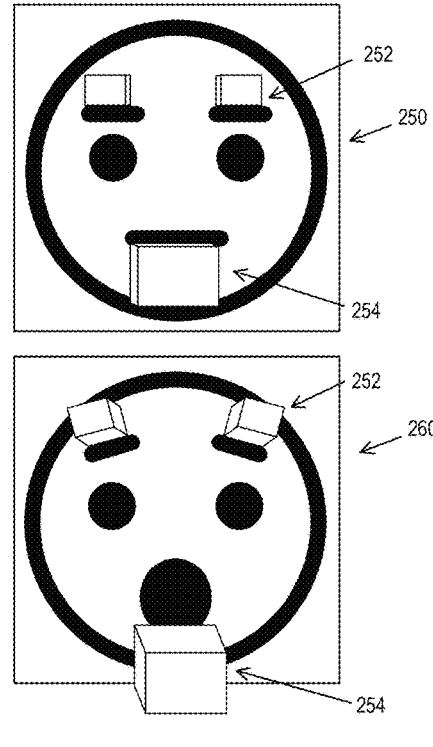
FIG. 2B shows an example image with virtual objects using a mesh surface constraint, according to an example embodiment.

FIG. 2B shows an example image with mesh surface constraint according to an example embodiment of the present application. In FIG. 2B, a 3D object is placed on an image (e.g., a face) with having the mesh surface constraint. In the example shown in FIG. 2B, an image 250 of the face with the neutral facial expression is provided with a first 3D object 252 and a second 3D object 254. The first 3D object 252 is an eyebrow decoration while the second 3D object 204 is a goatee, generally corresponding to the 3D objects 202 and 204.

Another image 260 is shown of the face with a surprised facial expression, where eyes and eyebrows are raised and chin is lowered with an open mouth. In the example shown in FIG. 2B, the 3D objects 252 and 254 have been adjusted in position and orientation to align with the eyes and chin of the face with the different facial expression. Accordingly, the decorative pattern of the 3D object 252 aligns with the eyebrows of the face and the goatee of the 3D object 254 aligns with the chin. Specifically, the eyebrow 3D object is located above the eyebrow of the face and properly extends over the eyebrow of the face, and the goatee is located below the open mouth of the face. Moreover, a 3D orientation of the 3D object 252 (eyebrow) has been changed to be directed upwards and outwards (i.e., towards ears of the face) to more closely follow the eyebrows of the face, while a 3D orientation of the 3D object 254 (goatee) has been changed to be rotated forwards to more closely follow the chin of the face.

Figure 3:
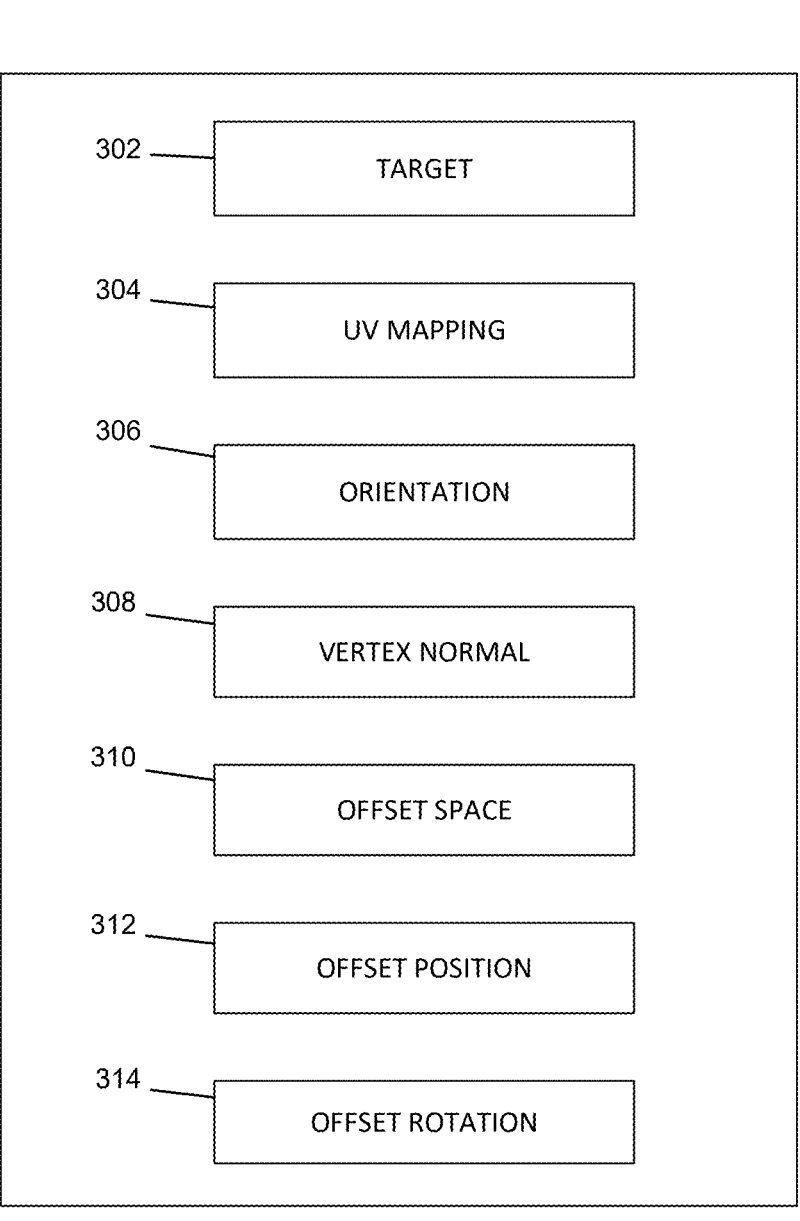
FIG. 3 shows a block diagram of an example mesh surface constraint data structure, according to an example embodiment.

FIG. 3 shows a block diagram of an example of a mesh surface constraint 300, according to an example embodiment. The mesh surface constraint 300 generally corresponds to the transformation data structure described above and includes one or more of a target 302, a UV mapping 304, an orientation 306, a vertex normal flag 308, an offset space 310, an offset position 312, and an offset rotation 314 according to an example embodiment. In other embodiments, some of the elements of the mesh surface constraint 300 may be omitted. In some examples, an instance of the mesh surface constraint 300 is generated for each 3D virtual object within an AR scene. In other examples, a shared data structure is generated for two or more 3D virtual objects where similar parameters are shared (e.g., using a same target object, same orientation In the example shown in FIG. 3, the target 302 enables attachment of any object in a scene to a targeted mesh surface. Generally, the target 302 is a reference to a target mesh surface of the target object within an AR scene, such as the chin or eyebrow of the face in the image 250 shown in FIG. 2B. The reference may be an object identifier corresponding to the target mesh surface, an object identifier corresponding to the target object, a combination thereof, or other suitable identifier. As described above, attachment using the target mesh surface enables precise positioning of the 3D virtual object. By default, the target 302 is not set (e.g., set to "None"), but the target 302 can be adjusted to refer to any suitable object present in the AR scene.

The UV mapping 304 allows for adjustment of a texture orientation of the 3D virtual object's surface to match the target mesh surface of the target object. The UV mapping 304 generally corresponds to the texture alignment field described above, using a Vector2 field. By manipulating the Vector2 filed, an alignment of an image texture applied to a surface of the 3D virtual object can be refined by a user to seamlessly integrate the 3D virtual object with the target mesh surface. The default value of the UV mapping 304 is [0,0] (e.g., no offset provided), but it can range from a maximum negative value to a maximum positive value on both the X and the Y axis, where the maximum values may be limits within the rendering engine (e.g., values within a 32 bit signed integer), limits within a display area of the computing device (e.g., a display resolution of 1920×1080 pixels), or other suitable range. This provides extensive flexibility in texture orientation adjustment. In some examples, values received from a user that exceed the range are moved or "snapped" to a nearest feasible UV on the UV mapping. This improves efficiency when developing the 3D virtual object and, in some examples, provides for unique visual effects (e.g., when all or a portion of a target mesh is snapped to an end of the range).

In the example shown in FIG. 3, the orientation 306 enables alignment of the 3D virtual object with the targeted mesh surface through rotation adjustment. The orientation 306 provides several options to define how the 3D virtual object should be anchored to the target mesh surface. As a first option, the orientation 306 specifies that a position of the target mesh surface is used to anchor the 3D virtual object. With this option, the 3D virtual object tracks a position of the target mesh surface, but not an orientation of the target mesh surface. For example, to provide a large bug eyes effect on a user's eyes where the bug eyes always appear to face the image sensor 114, the 3D virtual object of large eyes could be anchored to a target mesh surface corresponding to the user's eyes by position only, but not a rotation of the user's eyes, so any rotation of the user's head or eyes (e.g., as if the user were looking away from the image sensor 114) would still result in the large eyes facing the image sensor 114.

As a second option, the orientation 306 specifies that both position and orientation of the target mesh surface are used to anchor the 3D virtual object. With this option, using the large bug eye example described above, the 3D virtual object of the large eyes would move with the user's eyes (e.g., as their head moves within the frame) and also rotate to match a direction in which the user is looking.

As a third option, the orientation 306 specifies that a local coordinate system of the target mesh surface is used to anchor the 3D virtual object.

In the example shown in FIG. 3, the vertex normal flag 308 is utilized when the Position & Direction (the second option described above) is selected in the orientation 306. When the position and direction is selected, the 3D virtual object will be rotated according to an orientation of the target mesh surface. If the vertex normal flag 308 is enabled, a vertex normal of the target mesh surface is used as a Y axis for rotation pinning, where the vertex normal is a directional vector associated with a vertex and may be determined as a normalized average of surface normals of the faces that contain the vertex. If the vertex normal flag 308 is disabled (e.g., not enabled), a face normal of the target surface mesh is used as the Y axis for rotation pinning. By default, the vertex normal flag 308 is enabled (e.g., set to "True"), but the default value can be set to disabled (e.g., set to "False").

In the example shown in FIG. 3, the offset space 310 enables an adjustment of offset relative to different coordinate systems. The offset space 310 includes three options in a dropdown menu. The options included are World (e.g., world value), Object (e.g., object value), and Local (local value). The Local is a default value of the offset space 310. If the world value is selected, the offset adjustment is made based on a world coordinate system. If the object value is selected, the offset adjustment is made based on the target object's coordinates. If the local value is selected, the offset adjustments are made based on local coordinates of the target object.

In the example shown in FIG. 3, the offset position 312 allows for precise positioning of an object relative to the target mesh surface. The offset position 312 has a Vector3 field (e.g., X-Y-Z coordinates). By manipulating the Vector3 field, fine adjustments on the 3D virtual object's position can be achieved. The default value of the offset position 312 is [0,0,0], but the offset position 312 can range from a negative infinity to a positive infinity on the respective X, Y, and Z axis. This allows for broad customization of the 3D virtual object's position.

In the example shown in FIG. 3, the offset rotation 314 allows adjustment of rotation of a 3D virtual object relative to the target mesh surface. The offset rotation 314 also uses the Vector3 field (e.g., X-Y-Z axis). By manipulating the Vector3 field, precise rotation adjustments can be achieved. The default value of the offset rotation 314 is [0,0,0], but it can range from a negative infinity to a positive infinity on the respective X, Y, and Z axis. This enables an extensive range of rotation adjustments for the object.

FIG. 4 shows a flow diagram of an example for displaying a 3D virtual object, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the computing device 110 (e.g., via the mesh processor 116, the rendering engine 118), or other suitable computing device.

Method 400 begins with step 402. At step 402, a polygon mesh representation of a target object within an augmented reality (AR) scene is determined. The polygon mesh representation models a physical appearance of the target object. In some examples, the target object is at least a portion of a subject in one of a captured image or a 3D avatar. As described above, the target object may be a person or subject within a video, a car, bicycle, dog, cat, etc. The target object may be a head, torso, arm, leg, or finger of the person or subject. In some examples, the 3D virtual object is a facial feature decoration for a face of the subject. In other examples, the 3D virtual object comprises one of a virtual clothing piece or a virtual make-up feature (e.g., eyeglasses, eyelashes, facial hair, piercings, etc.)

At step 404, a target mesh surface of the polygon mesh representation is identified. In some examples, the target mesh surface is a surface onto which the 3D virtual object should be anchored. In other examples, the target mesh surface is a 3D vector that is normal to the surface onto which the 3D virtual object should be anchored.

At step 406, the target object is monitored and the polygon mesh representation is updated according to changes in the physical appearance of the target object. For example, as the target object moves within a frame of the image stream, or as a user changes their facial expression, etc. the polygon mesh representation is transformed to match the target object.

At step 408, the 3D virtual object is displayed within the AR scene according to a position of the target mesh surface on the updated polygon mesh representation, where the target mesh surface moves along with the target object.

In some examples, the polygon mesh representation comprises a plurality of vertices and edges between the plurality of vertices that form polygons and the target mesh surface comprises one of a vertex normal from the polygon mesh representation or a normal vector of a face of the polygon mesh representation. In some examples, the target object is a head of a subject and the target mesh surface corresponds to a moveable facial feature of the subject. For example, the target mesh surface may correspond to one of a chin, eyelid, eyebrow, lip, jaw, cheek, or nose of the subject.

In some examples, step 408 comprises rotating the 3D virtual object according to the position of the target mesh surface and an orientation of the target mesh surface. In other examples, step 408 comprises performing a UV mapping of a texture onto the 3D virtual object according to an orientation of the 3D virtual object. Performing the mapping may include adjusting a Vector2 field associated with a displayed position of the texture on the 3D virtual object. Performing the mapping may also include snapping a UV mapping value within the UV mapping to a maximum value of a range of the UV mapping.

Figure 5:
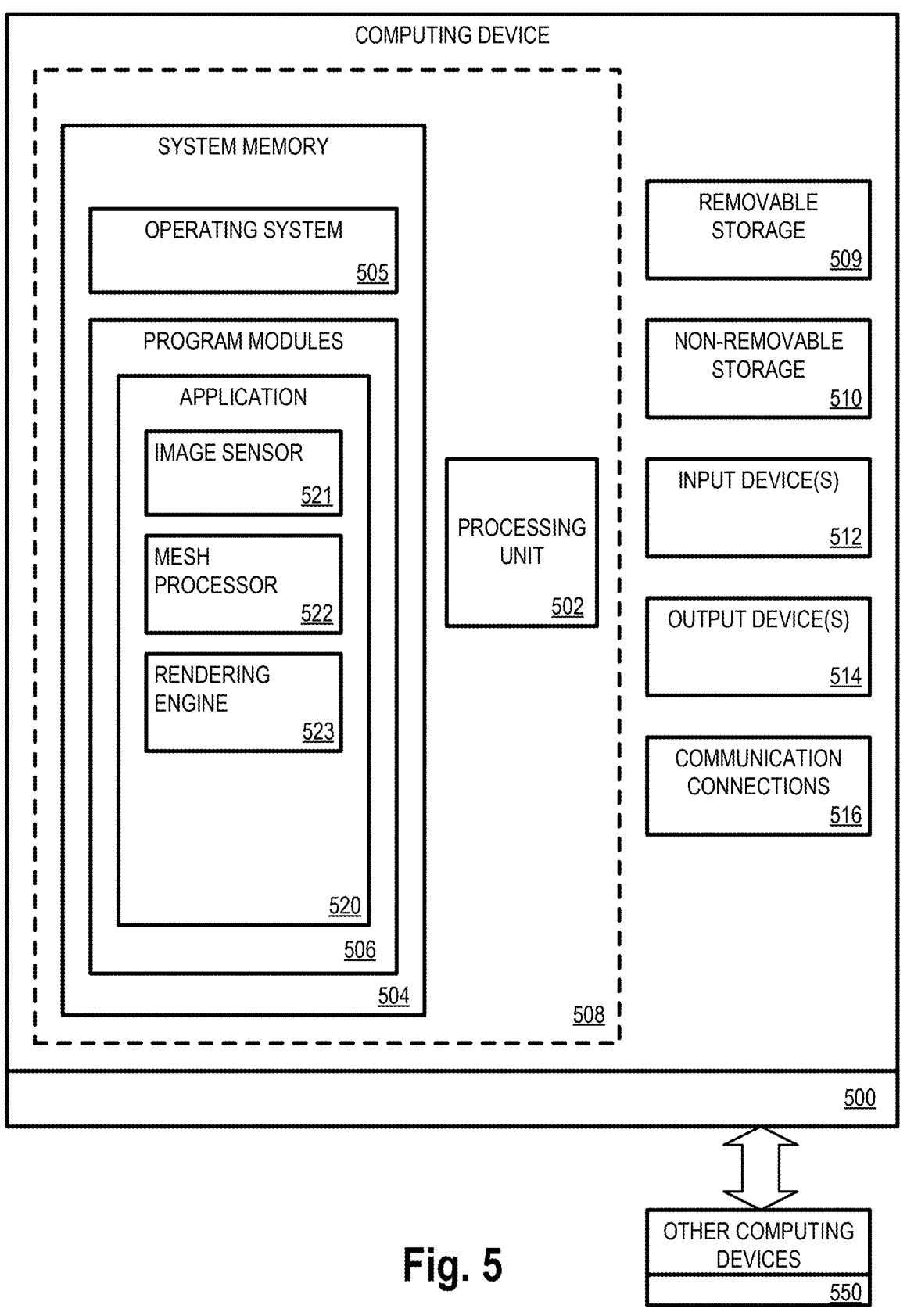
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may have computer executable instructions for implementing an image processor application 520 on a computing device (e.g., computing device 110), including computer executable instructions for image processor application 520 that can be executed to implement the methods disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running image processor application 520, such as one or more components with regard to FIG. 1, and, in particular, image sensor 521 (e.g., corresponding to image sensor 114), mesh processor 522 (e.g., corresponding to mesh processor 116), and rendering engine 523 (e.g., corresponding to rendering engine 118).

The operating system 505, for example, may be suitable for controlling the operation of the computing device 500. Furthermore, examples of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., image processor application 520) may perform processes including, but not limited to, the aspects, as described herein. Other program modules that may be used in accordance with aspects of the present disclosure, and in particular for training an image processor, may include image processor 521, prompt processor 522, augmentation processor 523, and/or neural network model 524.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
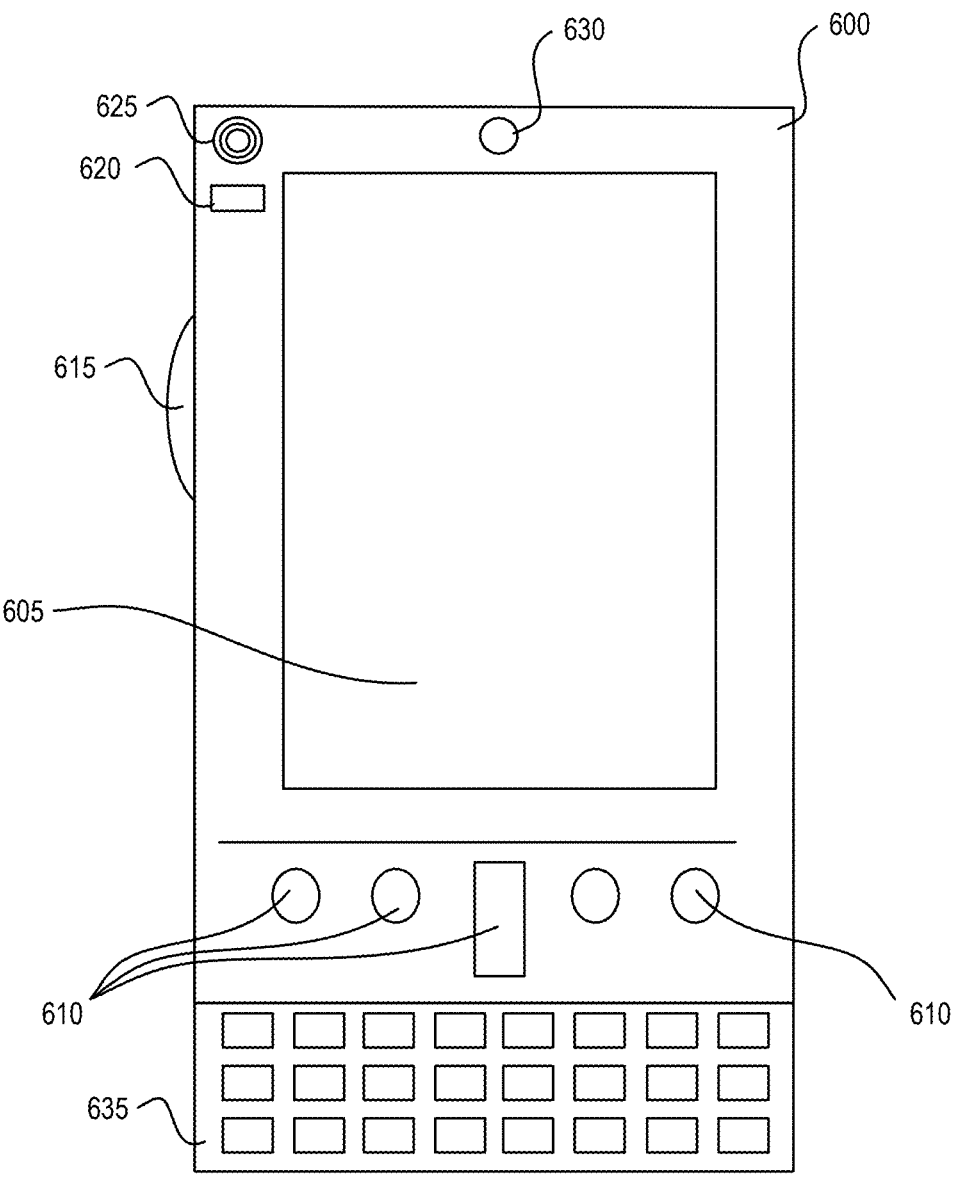
FIGS. 6 and 7 are simplified block diagrams of a computing device with which aspects of the present disclosure may be practiced.

FIG. 6 illustrates a mobile computing device 600, for example, a mobile telephone, a smart phone, wearable computer (such as a smart watch), a tablet computer, a laptop computer, and the like, with which examples of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may include a front-facing camera 630. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

Figure 7:
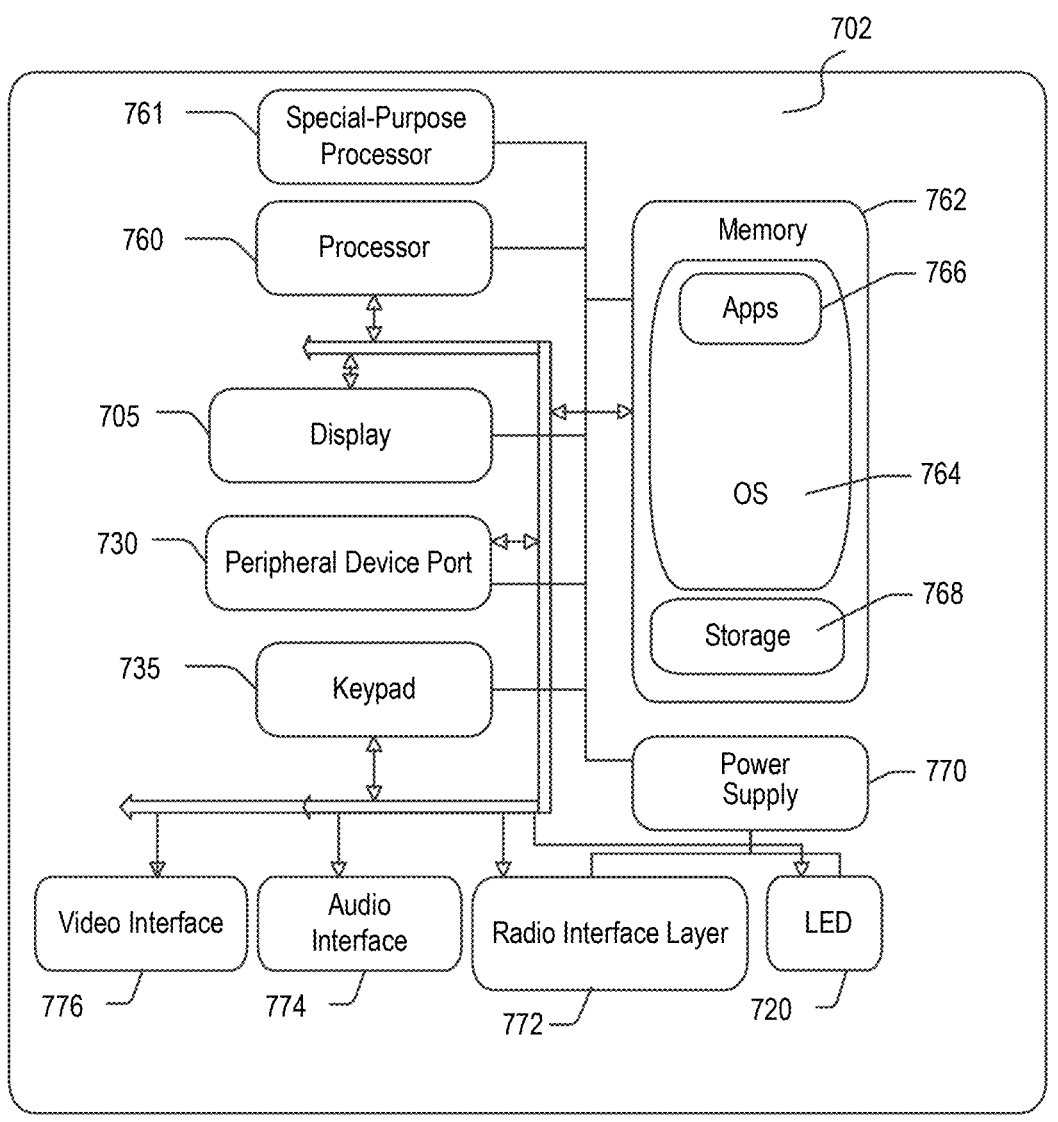

FIG. 7 is a block diagram illustrating the architecture of one aspect of a mobile computing device. That is, the mobile computing device 600 can incorporate a system (e.g., an architecture) 702 to implement some aspects. In one example, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone. The system 702 may include a display 705 (analogous to display 605), such as a touch-screen display or other suitable user interface. The system 702 may also include an optional keypad 735 (analogous to keypad 635) and one or more peripheral device ports 730, such as input and/or output ports for audio, video, control signals, or other suitable signals.

The system 702 may include a processor 760 coupled to memory 762, in some examples. The system 702 may also include a special-purpose processor 761, such as a neural network processor. One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer.

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer

772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 625 (e.g., audio transducer 625 illustrated in FIG. 6). In the illustrated example, the visual indicator 820 is a light emitting diode (LED) and the audio transducer 625 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with examples of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 600 implementing the system 702 may have additional features or functionality. For example, the mobile computing device 600 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 600 and stored via the system 702 may be stored locally on the mobile computing device 600, as described above, or the data may be stored on any number of storage media that may be accessed by the device via the radio interface layer 772 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 6 and 7 are described for purposes of illustrating the present methods and systems and is not intended to limit the disclosure to a particular sequence of steps or a particular combination of hardware or software components. The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A computing device for displaying a 3D virtual object for an augmented reality (AR) scene, the computing device comprising a processor and a non-transitory computer-readable memory, wherein the processor is configured to carry out instructions from the memory that configure the computing device to:

determine a polygon mesh representation of a target object within the AR scene, wherein the polygon mesh representation models a physical appearance of the target object;

identify a target mesh surface of the polygon mesh representation onto which the 3D virtual object should be anchored;

monitor the target object and updating the polygon mesh representation according to changes in the physical appearance of the target object;

perform a UV mapping of a texture onto the 3D virtual object according to an orientation of the 3D virtual object, wherein the UV mapping is used to adjust a surface of the 3D virtual object to match the polygon mesh representation of the target object; and display the 3D virtual object within the AR scene according to a position of the target mesh surface on the updated polygon mesh representation, wherein the target mesh surface moves along with the target object.

2. The computing device of claim 1, wherein the target object is at least a portion of a subject in one of a captured image or a 3D avatar.

3. The computing device of claim 2, wherein the target object is a head, torso, arm, leg, or finger of the subject.

4. The computing device of claim 2, wherein the 3D virtual object is a facial feature decoration for a face of the subject.

5. The computing device of claim 2, wherein the 3D virtual object comprises one of a virtual clothing piece or a virtual make-up feature.

6. The computing device of claim 1, wherein:

the polygon mesh representation comprises a plurality of vertices and edges between the plurality of vertices that form polygons; and the target mesh surface comprises one of a vertex normal from the polygon mesh representation or a normal vector of a face of the polygon mesh representation.

7. The computing device of claim 6, wherein the target object is a head of a subject and the target mesh surface corresponds to a moveable facial feature of the subject.

8. The computing device of claim 7, wherein the target mesh surface corresponds to one of a chin, eyelid, eyebrow, lip, jaw, cheek, or nose of the subject.

9. The computing device of claim 1, wherein displaying the 3D virtual object comprises rotating the 3D virtual object according to the position of the target mesh surface and an orientation of the target mesh surface.

10. The computing device of claim 1, wherein performing the UV mapping comprises adjusting a Vector2 field associated with a displayed position of the texture on the 3D virtual object.

11. The computing device of claim 1, wherein performing the UV mapping comprises snapping a UV mapping value within the UV mapping to a maximum value of a range of the UV mapping.

12. A method for displaying a 3D virtual object for an augmented reality (AR) scene, the method comprising:

determining a polygon mesh representation of a target object within the AR scene, wherein the polygon mesh representation models a physical appearance of the target object;

identifying a target mesh surface of the polygon mesh representation onto which the 3D virtual object should be anchored;

monitoring the target object and updating the polygon mesh representation according to changes in the physical appearance of the target object;

performing a UV mapping of a texture onto the 3D virtual object according to an orientation of the 3D virtual object, wherein the UV mapping is used to adjust a surface of the 3D virtual object to match the polygon mesh representation of the target object; and displaying the 3D virtual object within the AR scene according to a position of the target mesh surface on the updated polygon mesh representation, wherein the target mesh surface moves along with the target object.

13. The method of claim 12, wherein the target object is at least a portion of a subject in one of a captured image or a 3D avatar.

14. The method of claim 13, wherein the target object is a head, torso, arm, leg, or finger of the subject.

15. The method of claim 13, wherein the 3D virtual object is a facial feature decoration for a face of the subject.

16. The method of claim 13, wherein the 3D virtual object comprises one of a virtual clothing piece or a virtual make-up feature.

17. The method of claim 12, wherein:

the polygon mesh representation comprises a plurality of vertices and edges between the plurality of vertices that form polygons; and the target mesh surface comprises one of a vertex normal from the polygon mesh representation or a normal vector of a face of the polygon mesh representation.

18. The method of claim 17, wherein the target object is a head of a subject and the target mesh surface corresponds to a moveable facial feature of the subject.

19. The method of claim 18, wherein the target mesh surface corresponds to one of a chin, eyelid, eyebrow, lip, jaw, cheek, or nose of the subject.

20. A computer readable non-transitory recording medium storing computer-executable program instructions that when executed by a processor cause a computer to execute displaying of a 3D virtual object for an augmented reality (AR) scene, the operation, comprising:

determining a polygon mesh representation of a target object within the AR scene, wherein the polygon mesh representation models a physical appearance of the target object;

identifying a target mesh surface of the polygon mesh representation onto which the 3D virtual object should be anchored;

monitoring the target object and updating the polygon mesh representation according to changes in the physical appearance of the target object;

performing a UV mapping of a texture onto the 3D virtual object according to an orientation of the 3D virtual object, wherein the UV mapping is used to adjust a surface of the 3D virtual object to match the polygon mesh representation of the target object; and displaying the 3D virtual object within the AR scene according to a position of the target mesh surface on the updated polygon mesh representation, wherein the target mesh surface moves along with the target object.

\* \* \* \* \*